Figure 1:
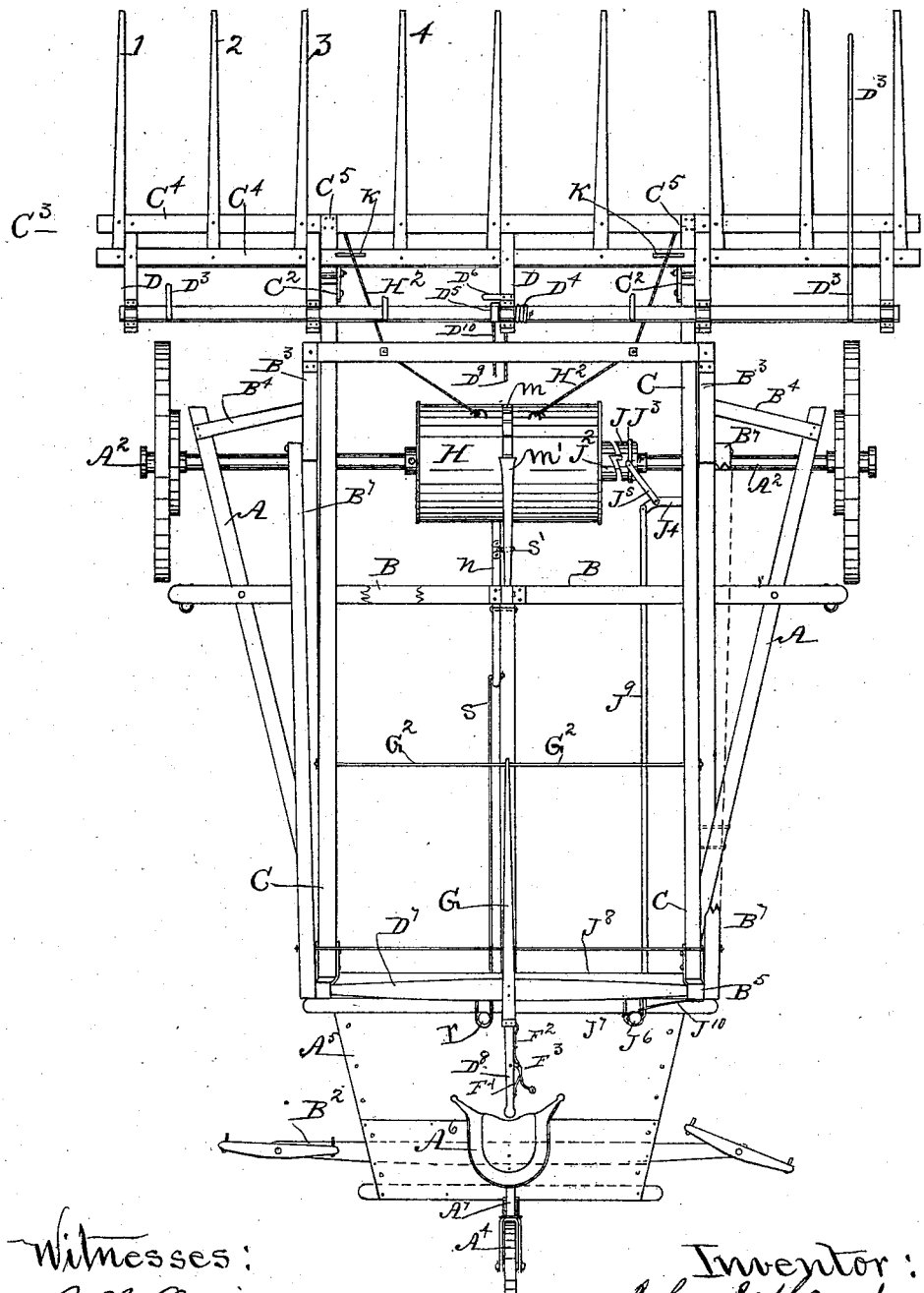

(No Model.)  3 Sheets—Sheet 1.

J. JEFFCOAT.
HAY RAKE, LOADER, AND STACKER.

No. 369,183.  Patented Aug. 30, 1887.

(No Model.) 3 Sheets—Sheet 2.
J. JEFFCOAT.
HAY RAKE, LOADER, AND STACKER.
No. 369,183. Patented Aug. 30, 1887.
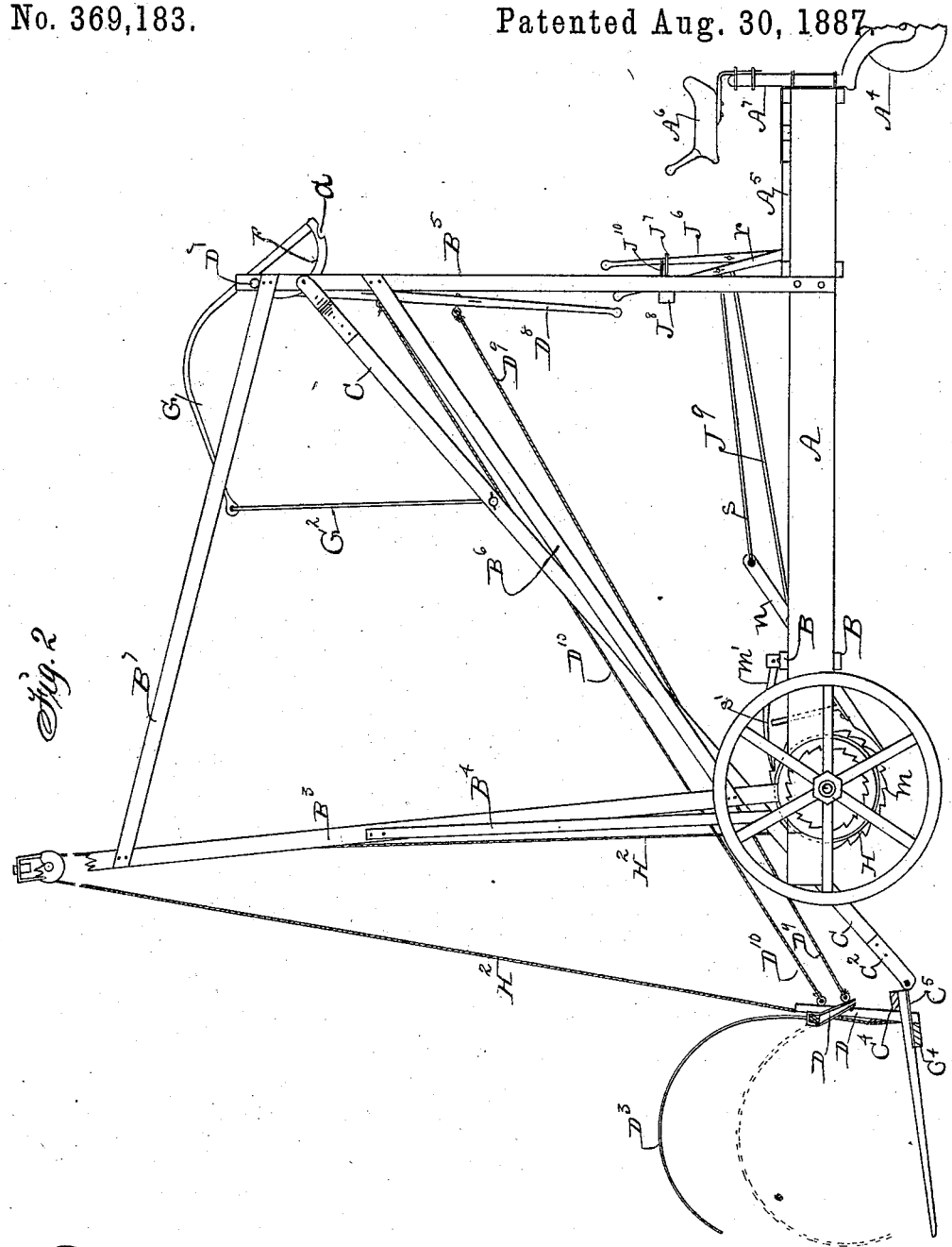

(No Model.) 3 Sheets—Sheet 3.
J. JEFFCOAT.
HAY RAKE, LOADER, AND STACKER.
No. 369,183. Patented Aug. 30, 1887.
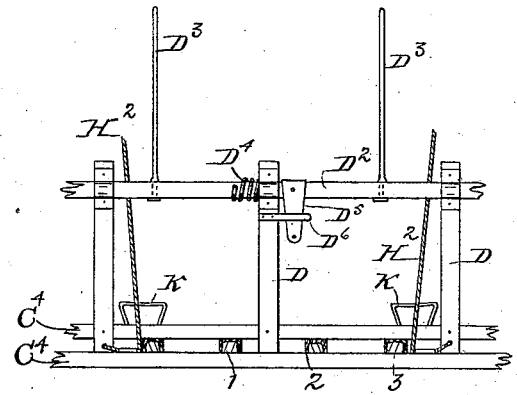
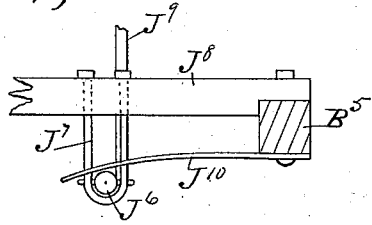
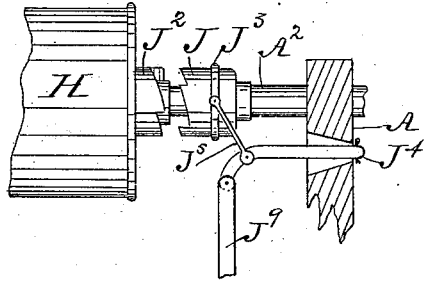
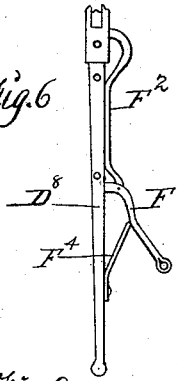
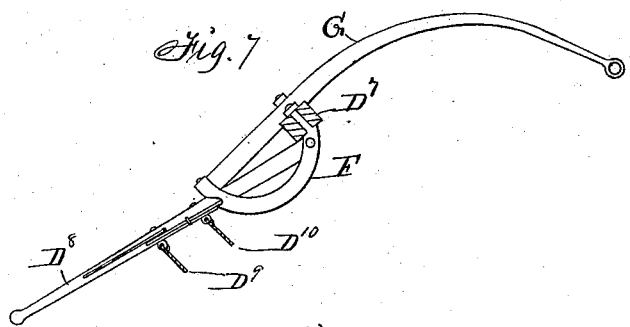
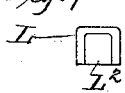
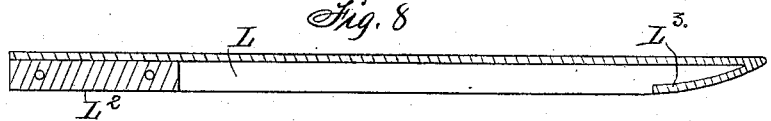
Witnesses:
R. H. Orwig.
C. M. Stiles.
Inventor:
John Jeffcoat,
By Thomas G. Orwig, Att'y.

UNITED STATES PATENT OFFICE.

JOHN JEFFCOAT, OF ONAWA, IOWA.

HAY RAKE, LOADER, AND STACKER.

SPECIFICATION forming part of Letters Patent No. 369,183, dated August 30, 1887.

Application filed April 16, 1886. Serial No. 199,148. (No model.)

*To all whom it may concern:*

Be it known that I, JOHN JEFFCOAT, a citizen of the United States of America, and a resident of Onawa, in the county of Monona and State of Iowa, have invented an Improved Hay Rake, Loader, and Stacker, of which the following is a specification.

My invention relates to the machine shown and described in the United States Letters Patent No. 86,345, dated February 2, 1869; and it consists in the construction and combination of operative mechanisms with a tractable carriage, as hereinafter fully set forth, pointed out in my claims, and illustrated in the accompanying drawings, in which—

Figure 1 is a top view, and Fig. 2 a side view, of my complete machine. Fig. 3 is a sectional view of the rake and hay-holding device combined. Fig. 4 is an enlarged top view of a section of the carriage-axle and drum, a clutch, and clutch-operating mechanism. Fig. 5 shows an automatic device for retaining the clutch inoperative. Figs. 6 and 7 are detail views of the hay holding and elevating mechanism combined. Fig. 8 is a longitudinal section, and Fig. 9 an end view, of my improved rake-tooth.

A are the side pieces of a carriage-frame of triangular shape, adapted to support my various operative devices. They are connected with a revolving axle, $A^2$, by means of bearings fixed to their front ends, as clearly shown in Fig. 1. Traction-wheels are connected with the ends of the axle in such a manner that they will rotate the axle in a forward movement of the carriage, but not in a backward movement.

$A^4$ is a caster-wheel pivoted to the center of the narrow rear end of the carriage-frame.

$A^5$ is a platform at the same end, upon which a person can stand.

$A^6$ is a seat fixed to the top of the shaft $A^7$ of the bearer that carries the caster-wheel. The seat is provided with handles that project upward from its opposite sides in such a manner that a person upon the seat and platform can readily turn the caster-wheel from a direct line of advance in opposite directions at pleasure, for the purpose of steering the complete carriage.

B are cross-pieces fixed to the top and bottom faces of the side pieces, A, and their branches $A^3$, to brace the carriage-frame and to extend laterally therefrom in opposite directions to serve as a yoke for connecting and directing horses when hitched to a doubletree, $B^2$, that is pivoted under the platform at the rear end of the carriage.

$B^3$ are the uprights of a frame fixed to the front end of the branches $A^3$ of the sides of the carriage-frame, and immediately over the axle $A^2$, in such a manner that the frame will extend vertically and incline forward to support pulleys, over which ropes are passed and operated to elevate the loaded rake.

$B^4$ are braces fixed to the side pieces, A, and the uprights $B^3$.

$B^5$ are the uprights of a frame fixed to the side pieces, A, at the front of the platform $A^5$ to support operative mechanisms.

$B^6$ and $B^7$ are braces fixed to the uprights $B^5$ and $B^3$ to mutually brace and support the two frames in their vertical positions.

C are rake-carriers in the form of straight beams hinged to the top portions of the uprights $B^3$ to extend forward on the insides of the uprights $B^3$, in such a manner that they can be swung up and down within the frame that extends vertically at the front and broad end of the carriage.

$C^2$ are irons fixed to the free ends and opposite sides of the beams, to serve as hinge-irons for connecting a rake.

$C^3$ represents a rake hinged to the irons $C^2$. It is composed of a series of straight teeth, 1 2 3 4, fixed between two parallel bars, $C^4$, that serve as a rake-head.

$C^5$ are hinge-irons, that have eyes, fixed to the rake-head to brace the parallel bars, and to extend their eyes between the perforated ends of the irons $C^2$ in such a manner that they can be detachably connected therewith by means of pintles or bolts passed horizontally through the irons and eyes.

D are uprights fixed between the parallel bars of the rake-head to form a part thereof, and to support a revolving shaft, $D^2$, in bearings fixed to their top ends, and to aid in keeping hay upon the series of rake-teeth.

$D^3$ are curved tines fixed to the shaft $D^2$.

$D^4$ is a coiled spring fixed to the shaft $D^2$ and one of the uprights D in such a manner that it will in its normal condition hold the tines $D^3$ up and away from the series of teeth, as required, to allow hay to be gathered upon the teeth as the machine is advanced in a field to gather hay from the surface of the ground.

$D^5$ represents an arm fixed to the shaft $D^2$, to extend at right angles and serve as a crank for revolving the shaft, and also to engage a stop device, $D^6$, that is fixed to the central upright, D, to restrict the motion of the shaft and its tines.

$D^7$ is a revolving shaft in bearings at the top ends of the uprights $B^5$.

$D^8$ is a lever hinged to an iron frame that is fixed to the center of the shaft $D^7$.

$D^9$ is a rope fastened to the end of the arm $D^5$ and to the central portion of the lever $D^8$.

F is an iron frame of semicircular shape fixed to the center of the shaft $D^7$.

$F^2$ represents a sliding latch in a loop fixed to the lever $D^8$, and connected with a lever, $F^3$, that is pivoted to the lever $D^8$, as clearly shown in Fig. 6. The free end of the sliding latch is bent at right angles and extends through a slot in the lever $D^8$ in such a manner that it will engage notches $a$ in the lower end of the frame F, and lock the lever fast to the frame, when the lever is pulled rearward to draw upon the ropes $D^9$ and $D^{10}$, to thereby operate the shaft $D^2$, as required, to bind the hay upon the rake by means of the tines $D^3$ and to raise the points of the rake-teeth off the ground.

$F^4$ is a spring fixed to the lever $D^8$ in such a manner that it will, in its normal condition, engage the lever $F^3$, and thereby retain the sliding latch engaged with the notches in the frame F and the curved tines $D^3$ fastened down upon the hay on the rake until elevated and in position to be unloaded.

$D^{10}$ is a rope fixed to the center upright, D, of the rake and to the lever $D^8$, to extend parallel with the rope D, for the purpose of raising the points of the rake-teeth off the ground and preventing the rake from tilting forward when it is loaded and elevated.

G is an elbow-shaped arm fixed to the center of the rotating shaft $D^7$, and to the lower end of the semicircular frame F at the end of its short arm, and to the hinged rake-carrier beams C at the end of its long arm, by means of rods $G^2$, in such a manner as to produce a rake-carrying frame that practically has two centers of motion—one in the axis of the shaft $D^7$ and another at the pivots of the hinged beams C—as required to support and carry and operate the hay-binding and rake-holding devices in concert with the rake-elevating mechanism for the purpose of keeping the rake in a horizontal position while it is being elevated.

H is a drum fixed to the center of the axle $A^2$.

$H^2$ are ropes fixed to the drum, passed over pulleys attached to the cross-piece fixed to the tops of the uprights $B^3$, and from thence down and fastened to the rake-head in any suitable way, in such a manner that when the drum is rotated the ropes will be wound thereon and the rake and its load and the rake-carrying frame elevated.

J is the sliding part of a clutch feathered on the axle $A^2$, and adapted to engage its counterpart, $J^2$, that is fixed to the end of the loose drum. It has an annular groove, in which is fitted a loose collar, $J^3$.

$J^4$ is an elbow-shaped lever pivoted to the side A of the carriage-frame.

$J^5$ is a yoke pivoted to the top and bottom of the collar $J^3$ and to the bend in the lever $J^4$ in such a manner that a vibratory motion of the lever $J^4$ will cause the clutch J to slide on the axle A, as required, to engage the mating section $J^2$, to thereby lock it fast to be rotated with the axle at the pleasure of the driver on the seat $A^6$.

$J^6$ is a lever pivoted to the platform $A^5$ to project vertically through a loop, $J^7$, that extends horizontally from a cross-bar, $J^8$, that is fixed to the uprights $B^5$.

$J^9$ is a rod that connects the lever $J^6$ with the lever $J^4$, to produce a compound lever adapted to operate the clutch when the machine is in motion.

$J^{10}$ is a spring fixed to the upright $B^5$ in such a manner that it will in its normal condition press the levers $J^6$ and $J^4$ rearward, as required, to retain the clutch open and the drum loose on the axle.

K (clearly shown in Figs. 1 and 3) are elastic guards fixed to the rake-head to engage the ropes $H^2$, for the purpose of preventing concussion when the rake is revolved on its axis, as required in dumping its load, or when power is applied to stretch the ropes to elevate the rake and its load.

L represents the body of my rake-tooth specially adapted to be used in my machine on account of its strength, durability, and light weight. It is composed of plate metal doubled into inverted-U shape in its cross-section. Its rear end is filled with a wooden block, $L^2$, that is fastened by means of rivets or nails. Its front end is closed and rounded off, and its under side, by means of a metal plate-section, $L^3$, formed on or fixed to the end of the plate L, in any suitable way, as required, to produce a tubular and pointed end adapted to slide upon the ground. These teeth are riveted or bolted to the bars $C^4$ and $C^5$, as shown in Fig. 2.

$m$ is a ratchet-wheel on the center of the drum H, and $m'$ a pawl pivoted to the cross-piece B.

$n$ is a brake-lever pivoted to the carriage-frame in such a manner that its lower end, or a shoe fixed thereto, can be readily brought in contact with the surface of the drum to check its motion, as required, in lowering the rake.

$r$ is a lever pivoted to the platform $A^5$, and connected with the brake-lever $n$ by means of a rod, $s$, in such a manner that a rearward motion of the lever $r$ will lift the free end of the brake to engage the drum, and a rod, $s'$, fixed to the same brake-lever, will at the same time engage the pawl $m'$ and lift it from the ratchet-wheel $m$.

In the practical use of my machine I hitch a horse to each side, mount the platform and seat, and lower the rake, so as to allow the front ends of the teeth to slide on the ground as the machine is advanced by the horses to gather hay upon the rake. When the load has thus accumulated on the rake, I pull the lever $D^8$ rearward, to thereby raise the points of the rake-teeth off the ground and rotate the shaft $D^2$ and bind the hay fast to the rake with the curved tines $D^3$. I next, when near the stack or load, press the lever $J^6$ forward, to thereby close the clutch, as required, to rotate the drum and elevate the rake and its load as the machine is advancing toward a stack or wagon upon which the hay is to be placed, and when the rake is in proper position over the stack or wagon I press the lever $F^3$ with my hand to release the lever $D^8$ from the frame F, as required, to unbind the hay and dump the rake.

To lower the rake, I pull the lever $r$ rearward to disengage the pawl from the drum and to apply the brake to the drum.

By repeating the operation the hay in the field can be rapidly gathered and placed on wagons or stacks, and much time, labor, and expense saved in securing and storing a hay crop.

I claim as my invention—

1. The metal frame F, having notches $a$, the shaft $D^7$, the arm G, the rod or link $G^2$, the rake-bearers C, the lever $D^8$, carrying a latch to engage the notches $a$ in said frame F, the ropes $D^9$ and $D^{10}$, the rake-head $C^4$, the uprights D, the arm $D^5$, and the rake-teeth $D^3$, arranged and combined substantially as shown and described, for the purpose of elevating the points of the rake-teeth, binding the hay in the rake, and lifting the loaded rake, in the manner set forth.

2. The combination of the shaft $D^2$, having a fixed arm, $D^5$, the spring $D^4$, the stop device $D^6$ on the upright D, the rope $D^9$, connected with the arm $D^5$, and the lever $D^8$, together with a rake-head suitably connected to the main frame carrying aforesaid upright D and fixed teeth, against which the teeth $D^3$ on the shaft $D^2$ act, substantially as shown and described, for the purposes stated.

3. A rake-tooth composed of a metal plate, L, having a filled rear end, $L^2$, and a closed and pointed front end, $L^3$, substantially as shown and described, for the purposes stated.

JOHN JEFFCOAT.

Witnesses:
GEO. UNDERHILL,
JOHN CLEGHORN.